United States Patent [19]

Teixeira

[11] Patent Number: 5,127,181
[45] Date of Patent: Jul. 7, 1992

[54] PORTABLE FISHING CUSHION

[76] Inventor: Tommy A. Teixeira, 325-B Karsten Dr., Wahiawa, Hi. 96786

[21] Appl. No.: 633,786

[22] Filed: Dec. 26, 1990

[51] Int. Cl.⁵ .................................................. A01K 97/10
[52] U.S. Cl. ........................................ 43/21.2; 297/188
[58] Field of Search .................. 43/21.2; 297/188, 217, 297/192; 248/514, 520, 537; 114/363

[56] References Cited

U.S. PATENT DOCUMENTS

| | | | |
|---|---|---|---|
| 2,749,067 | 6/1956 | Gorenflo | 43/21.2 |
| 2,877,828 | 3/1959 | Barnette, Jr. | 43/21.2 |
| 3,151,910 | 10/1964 | Larson | 114/363 |
| 3,560,047 | 2/1971 | Davis | 297/188 |
| 4,278,289 | 7/1981 | Esposito | 297/188 |
| 4,460,216 | 7/1984 | Keller | 297/217 |
| 4,835,896 | 6/1989 | Bowen | 297/188 |

Primary Examiner—Richard K. Seidel
Assistant Examiner—James Miner
Attorney, Agent, or Firm—Michael I. Kroll

[57] ABSTRACT

A portable fishing cushion is provided and consists of a base assembly placed upon a flat surface such as on a boat or the like, a seat assembly having a front cutout area, in which the seat assembly is secured onto the base assembly and a rod holder assembly swively mounted within the front cutout area of the seat assembly over the base assembly. A person can sit upon the seat assembly and place a handle of a fishing rod into the rod holder assembly between their legs so that the person can fish therefrom.

15 Claims, 2 Drawing Sheets

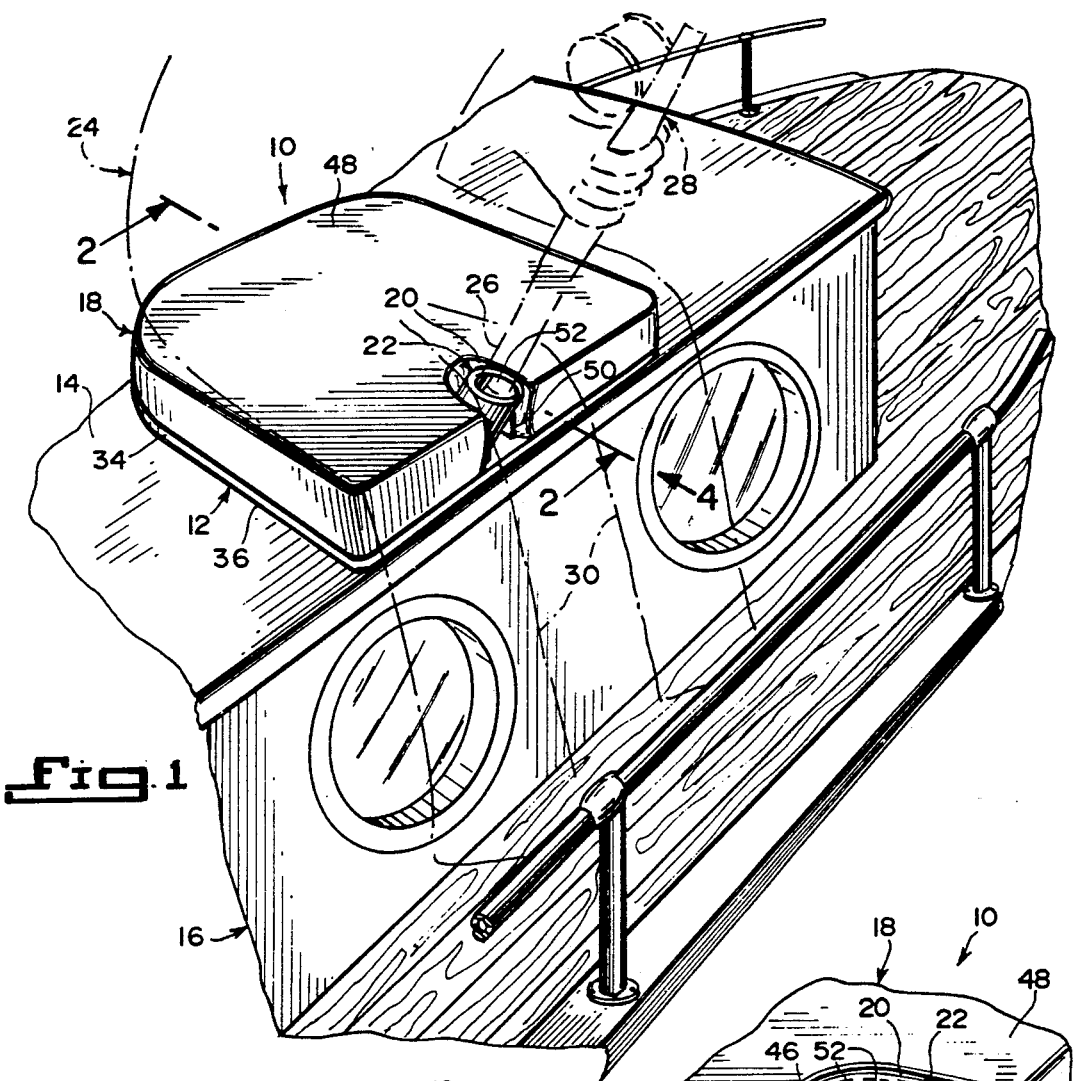
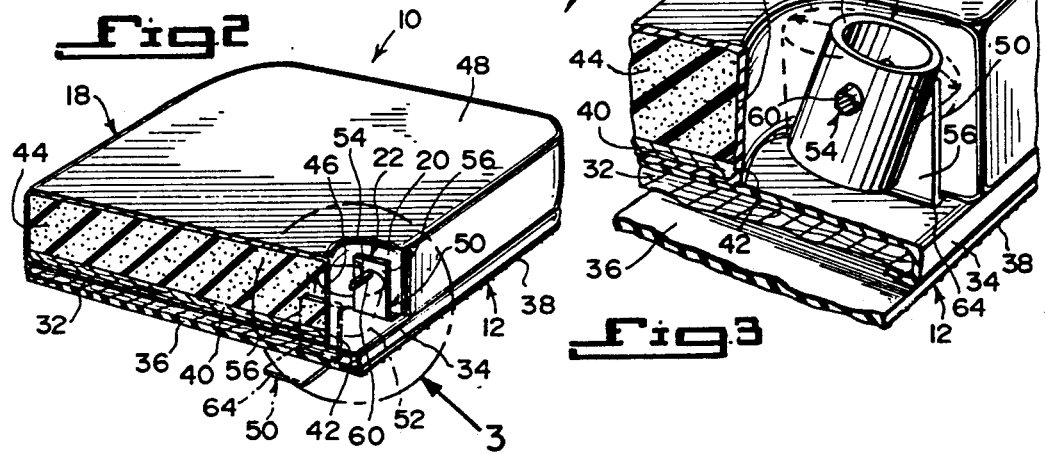

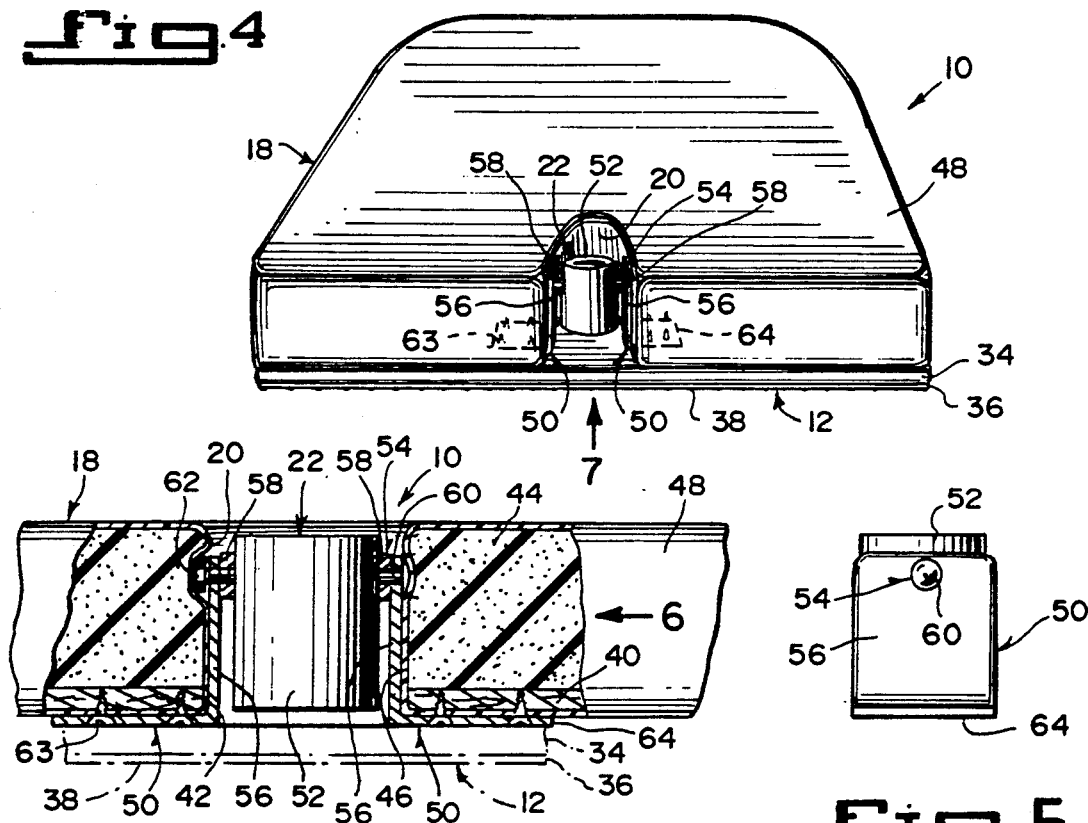
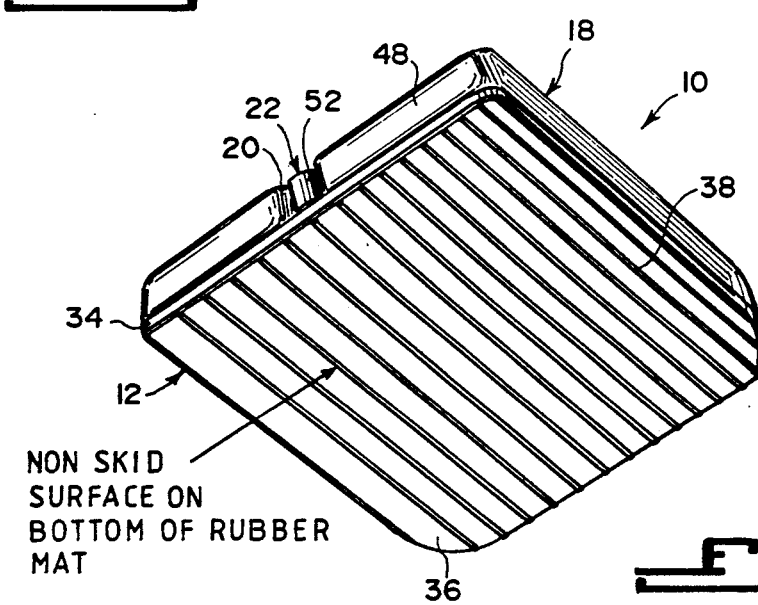
NON SKID
SURFACE ON
BOTTOM OF RUBBER
MAT

5,127,181

PORTABLE FISHING CUSHION

BACKGROUND OF THE INVENTION

1. Field of the Invention

The instant invention relates generally to seat pads and more specifically it relates to a portable fishing cushion.

2. Description of the Prior Art

Numerous seat pads have been provided in prior art that are adapted to be made of soft materials that may be sat upon and used on chairs, benches or the like. While these units may be suitable for the particular purpose to which they address, they would not be as suitable for the purposes of the present invention as heretofore described.

SUMMARY OF THE INVENTION

A primary object of the present invention is to provide a portable fishing cushion that will overcome the shortcomings of the prior art devices.

Another object is to provide a portable fishing cushion that makes fishing easier when a person sits on the cushion and uses the rod holder assembly instead of standing the reel in big fish.

An additional object is to provide a portable fishing cushion that is not bulky so that it is very convenient and light to be carried anywhere a person wants to go fishing.

A further object is to provide a portable fishing cushion that is simple and easy to use.

A still further object is to provide a portable fishing cushion that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention used on a boat.

FIG. 2 is a cross sectional perspective view taken along line 2—2 in FIG. 1.

FIG. 3 is an enlarged perspective view as indicated by arrow 3 in FIG. 2.

FIG. 4 is a front perspective view as indicated by arrow 4 in FIG. 1.

FIG. 5 is a front view of a portion of the instant invention with parts broken away and in section.

FIG. 6 is a side view of the rod holder assembly as indicated by arrow 6 in FIG. 5.

FIG. 7 is a bottom perspective view as indicated by arrow 7 in FIG. 4.

DETAILED DESCRIPTION OF THE PREFERRED EMBODIMENTS

Turning now descriptively to the drawings, in which similar reference characters denote similar elements throughout the several views, the Figures illustrate a portable fishing cushion 10 consisting of a base assembly 12 placed upon a flat surface 14 such as on a boat 16 or the like. A seat assembly 18 having a front cutout area 20, is secured onto the base assembly 12. A rod holder assembly 22 is swively mounted within the front cutout area 20 of the seat assembly 18 over said base assembly 12. A person 24 can sit upon the seat assembly 18 and place a handle 26 of a fishing rod 28 into the rod holder assembly 22 between their legs 30 so that the person 24 can fish therefrom.

The base assembly 12 includes a plate 32 fabricated out of a sturdy material, a material layer 34 placed over the plate 32 and a mat 36 having a non skid bottom surface 38 in which the mat 36 is secured to the underside of the pate 32.

The seat assembly 18 includes a platform 40 fabricated out of a sturdy material in which the platform 40 has a front cutout area 42. A pad 44 fabricated out of a soft material, has a front cutout area 46 and is placed onto the platform 40 while a covering 48 is placed about the platform 40 and the pad 44.

The rod holder assembly 22 includes a pair of L-shaped brackets 50, each of which is mounted to an opposite side of the front cutout area 20 in the seat assembly 18. A sleeve 52 fits between the L-shaped brackets 50 while a shaft assembly 54 extends through the vertical arms 56 of the L-shaped brackets 50 and the sleeve 52 so that the sleeve 52 can receive the handle 26 of the fishing rod 28 and swivel on the shaft assembly 54 between the L-shaped brackets 50. The shaft assembly 54 includes a pair of washers 58, each to fit between the vertical arm 56 of one L-shaped bracket 50 and the sleeve 52. A bolt 60 extends through the washers 58 and the sleeve 52 and a nut 62 threads onto the end of the bolt 60.

Each L-shaped bracket 50 is mounted to an opposite side of the front cutout area 20 in the seat assembly 18 by a plurality of screws 63 extending through a horizontal arm 64 of the L-shaped bracket 50, the covering 48 and into the underside of the platform 40. The plate 32 in the base assembly 12 is made of wood, the material layer 34 in the base assembly 12 is made of vinyl fabric and the mat 36 in the base assembly 12 is made of hard rubber. The platform 40 in the set assembly 18 is made of wood, the pad 40 in the seat assembly 18 is made out of foam rubber and the covering 48 in the seat assembly 18 is made out of vinyl fabric, each L-shaped bracket 50 in the rod holder assembly 22 is made out of stainless steel, while the sleeve 52 in the rod holder assembly 22 is made out of plastic piping. The washers 58, the bolt 60 and the nut 62 in the shaft assembly 54 are all made out of stainless steel, while each mounting screw 63 is made out of stainless steel.

Steps In How To Use The Portable Fishing Cushion 10

1. The person 24 simply places the cushion 10 onto the flat surface 14 of the boat 16, so that the non skid bottom surface 38 will keep it in a stationary position thereto.
2. The person 24 then sits upon the covering 48 that is over the pad 44 on the platform 40 of the seat assembly 18.
3. The handle 26 of the fishing rod 28 is then inserted into the sleeve 52 in the rod holder assembly 22.
4. The sleeve 52 can now swivel on the shaft 54 thereby allowing the person 24 to grip the fishing rod 28 and position it at the proper angle for fishing.

5. When the person 24 is done fishing the handle 26 of the fishing rod 28 can be removed from the sleeve 52.

6. The person 24 can now get off the seat assembly 18 and pick up the cushion 10 and carry it to another location.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art witout departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A portable fishing cushion, comprising:
    a) a base assembly placed upon a flat surface wherein said base assembly includes:
        a) a plate fabricated out of sturdy material;
        b) a fabric material layer placed over and in contact with said plate; and
        c) a mat having a non skid bottom surface wherein said mat is in contact with and secured to the underside of said plate;
    a seat assembly having a front cutout area, said seat assembly secured onto said base assembly; and
    c) a rod holder assembly positioned entirely above the base assembly, said rod holder assembly swivelly mounted within said front cutout area of said seat assembly so that a person can sit upon said seat assembly and place a handle of a fishing rod into said rod holder assembly between their legs so that the person can fish therefrom.

2. A portable fishing cushion as recited in claim 1, wherein said seat assembly includes:
    a) a platform fabricated out of a sturdy material, said platform having a front cutout area;
    b) a pad fabricated out of a soft material, said pad having a front cutout area and placed onto said platform; and
    c) a covering placed about said platform and said pad.

3. A portable fishing cushion as recited in claim 2, wherein said rod holder assembly includes:
    a) a pair of L-shaped brackets, each of which is mounted to an opposite side of said front cutout area in said seat assembly;
    b) a sleeve to fit between said L-shaped brackets; and
    c) a shaft assembly extending through the vertical arms of said L-shaped brackets and said sleeve so that said sleeve can receive the handle of the fishing rod and swivel on said shaft assembly between said L-shaped brackets.

4. A portable fishing cushion as recited in claim 3, wherein said shaft assembly incudes:
    ) a pair of washers, each to fit between the vertical arm of one said L-shaped bracket and said sleeve;
    b) a bolt which extends through said washers and said sleeve; and
    c) a nut which threads onto the end of said bolt.

5. A portable fishing cushion as recited in claim 4, wherein each of said L-shaped brackets is mounted to an opposite side of said front cutout area in said seat assembly by a plurality of screws extending through a horizontal arm of said L-shaped bracket, said covering and into the underside of said platform.

6. A portable fishing cushion as recited in claim 5, wherein said plate in said base assembly is made of wood.

7. A portable fishing cushion as recited in claim 6, wherein said material layer in said base assembly is made of vinyl fabric.

8. A portable fishing cushion as recited in claim 7, wherein said mat in said base assembly is made of hard rubber.

9. A portable fishing cushion as recited in claim 8, wherein said platform in said seat assembly is made of wood.

10. A portable fishing cushion as recited in claim 9, wherein said pad in said seat assembly is made out of foam rubber.

11. A portable fishing cushion as recited in claim 10, wherein said covering on said seat assembly is made out of vinyl fabric.

12. A portable fishing cushion as recited in claim 11, wherein said L-shaped bracket in said rod holder assembly is made out of stainless stell.

13. A portable fishing cushion as recited in claim 12, wherein said sleeve in said rod holder assembly is made out of plastic piping.

14. A portable fishing cushion as recited in claim 13, wherein said washers, said bolt and said nut in said shaft assembly are all made out of stainless steel.

15. A portable fishing cushion as recited in claim 14, wherein each said mounting screw is made out of stainless steel.

* * * * *